(12) United States Patent
Ren

(10) Patent No.: US 8,768,606 B2
(45) Date of Patent: *Jul. 1, 2014

(54) LIVE TRAFFIC CONGESTION DETECTION

(71) Applicant: Verizon Patent and Licensing Inc., Arlington, VA (US)

(72) Inventor: Dahai Ren, Lincoln, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,299

(22) Filed: Jun. 20, 2013

(65) Prior Publication Data

US 2013/0289863 A1 Oct. 31, 2013

Related U.S. Application Data

(63) Continuation of application No. 13/294,662, filed on Nov. 11, 2011, now Pat. No. 8,532,914.

(51) Int. Cl.
*G08G 1/00* (2006.01)
*G06G 7/76* (2006.01)

(52) U.S. Cl.
USPC .......................... 701/118; 701/117; 701/119

(58) Field of Classification Search
USPC ......................... 701/118, 119, 117
See application file for complete search history.

(56) References Cited

U.S. PATENT DOCUMENTS

| | | | |
|---|---|---|---|
| 4,847,772 A | 7/1989 | Michalopoulos et al. | |
| 6,188,778 B1 | 2/2001 | Higashikubo et al. | |
| 6,594,576 B2 | 7/2003 | Fan et al. | |
| 6,711,493 B1 | 3/2004 | Andrews et al. | |
| 7,020,556 B2 | 3/2006 | Kim | |
| 7,176,813 B2 | 2/2007 | Kawamata et al. | |
| 7,439,878 B2 | 10/2008 | Kato et al. | |
| 7,519,472 B1 | 4/2009 | Grigsby et al. | |
| 7,522,995 B2 | 4/2009 | Nortrup | |
| 7,613,564 B2 | 11/2009 | Vorona | |
| 7,912,630 B2 | 3/2011 | Alewine et al. | |
| 8,332,131 B2 * | 12/2012 | Lee et al. | 701/117 |
| 2007/0038360 A1 | 2/2007 | Sakhpara | |
| 2009/0125219 A1 * | 5/2009 | Lee et al. | 701/118 |
| 2009/0271101 A1 | 10/2009 | Relyea et al. | |
| 2011/0125392 A1 | 5/2011 | Hao | |
| 2011/0208646 A1 | 8/2011 | McMaster et al. | |
| 2011/0276259 A1 | 11/2011 | Nortrup | |

FOREIGN PATENT DOCUMENTS

CN 102005129 4/2011

* cited by examiner

*Primary Examiner* — Mary Cheung
*Assistant Examiner* — Michael Berns

(57) ABSTRACT

A user device may be configured to output, to a server device, a request for traffic congestion information, receive audio or visual information regarding an identified occurrence of traffic congestion; and present a visual representation of the occurrence of traffic congestion. The visual representation may include a selectable option to access at least a portion of the received audio or visual information regarding the occurrence of traffic congestion. The user device may further be configured to present, based on a selection of the selectable option, the at least a portion of the received audio or visual information regarding the occurrence of the traffic congestion.

20 Claims, 9 Drawing Sheets

LIVE TRAFFIC CONGESTION DETECTION

CROSS-REFERENCE TO RELATED APPLICATION

This application is a continuation of U.S. patent application Ser. No. 13/294,662, titled "Live Traffic Congestion Detection," filed Nov. 11, 2011, the contents of which are incorporated herein in their entirety.

BACKGROUND

Users, such as automobile drivers on roads, often desire to view traffic information associated with the roads on which they wish to travel. Traffic information can inform the users when congestion, or traffic jams, occur on these roads.

One technique for informing users about traffic involves placing cameras along a road, and allowing users to view live feeds, captured by these cameras. However, such an approach may be costly, as cameras must be placed in each location that is to be monitored. Additionally, such an approach does not allow users to view traffic at locations that do not have a camera present. Furthermore, the pictures and/or videos captured by these cameras may not be of very high quality.

Another technique for informing users about traffic involves providing a software application that users may run on mobile devices (e.g., cellular phones). The application, running on a particular mobile device, may continuously monitor a geographic location of the particular mobile device, and periodically provide information regarding the geographic location of the particular mobile device to a server. The server may receive information regarding the geographic locations of multiple mobile devices, and may determine that congestion occurs when many mobile devices are concentrated on a particular stretch of road. However, such an approach may consume excessive network bandwidth (e.g., bandwidth of a network over which the mobile devices communicate with the server). Additionally, such an approach may consume excessive battery power at the mobile devices.

DETAILED DESCRIPTION OF PREFERRED EMBODIMENTS

The following detailed description refers to the accompanying drawings. The same reference numbers in different drawings may identify the same or similar elements.

Figure 1A:
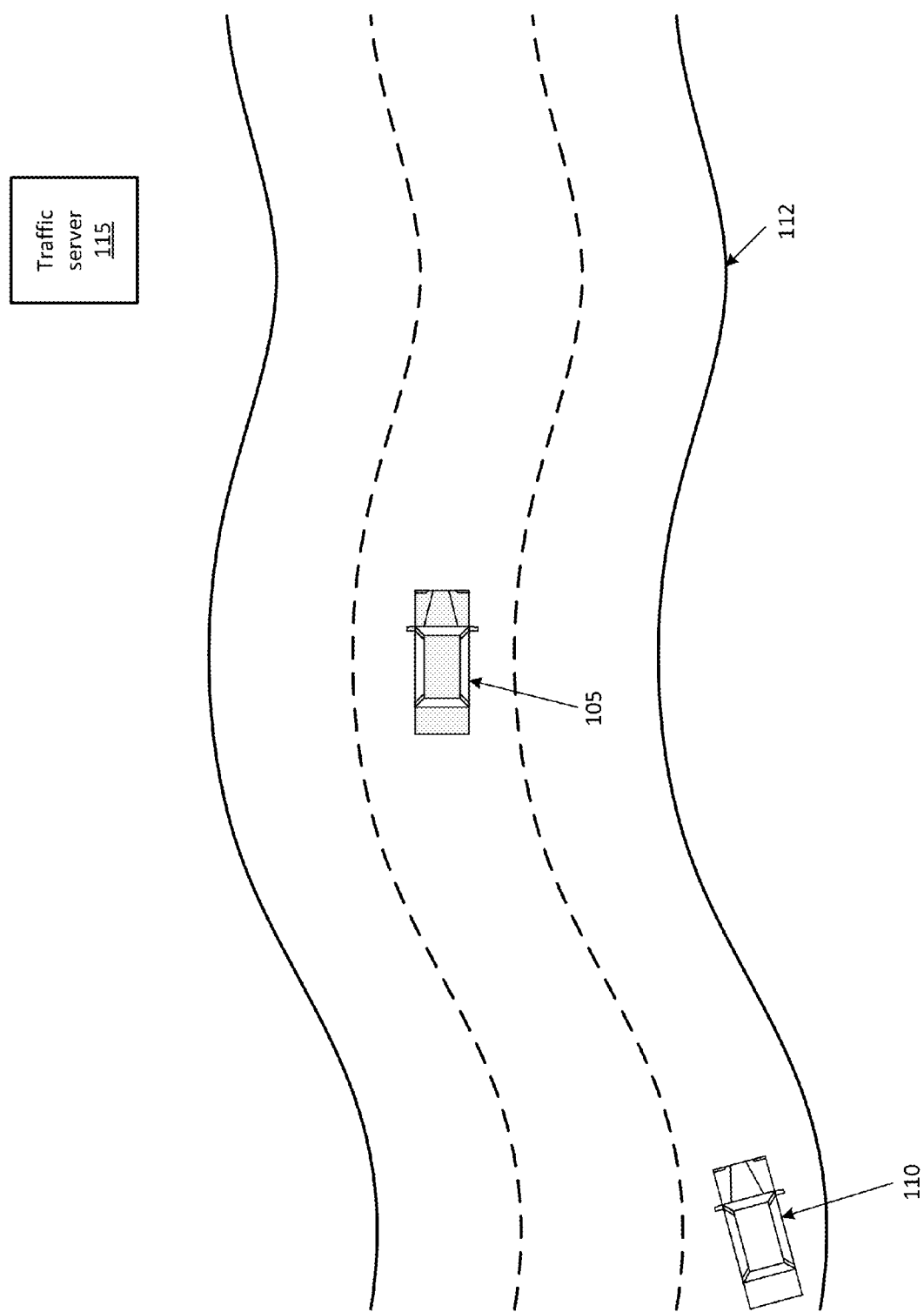
FIGS. 1A and 1B illustrate an overview of an example implementation described herein.
Figure 1B:
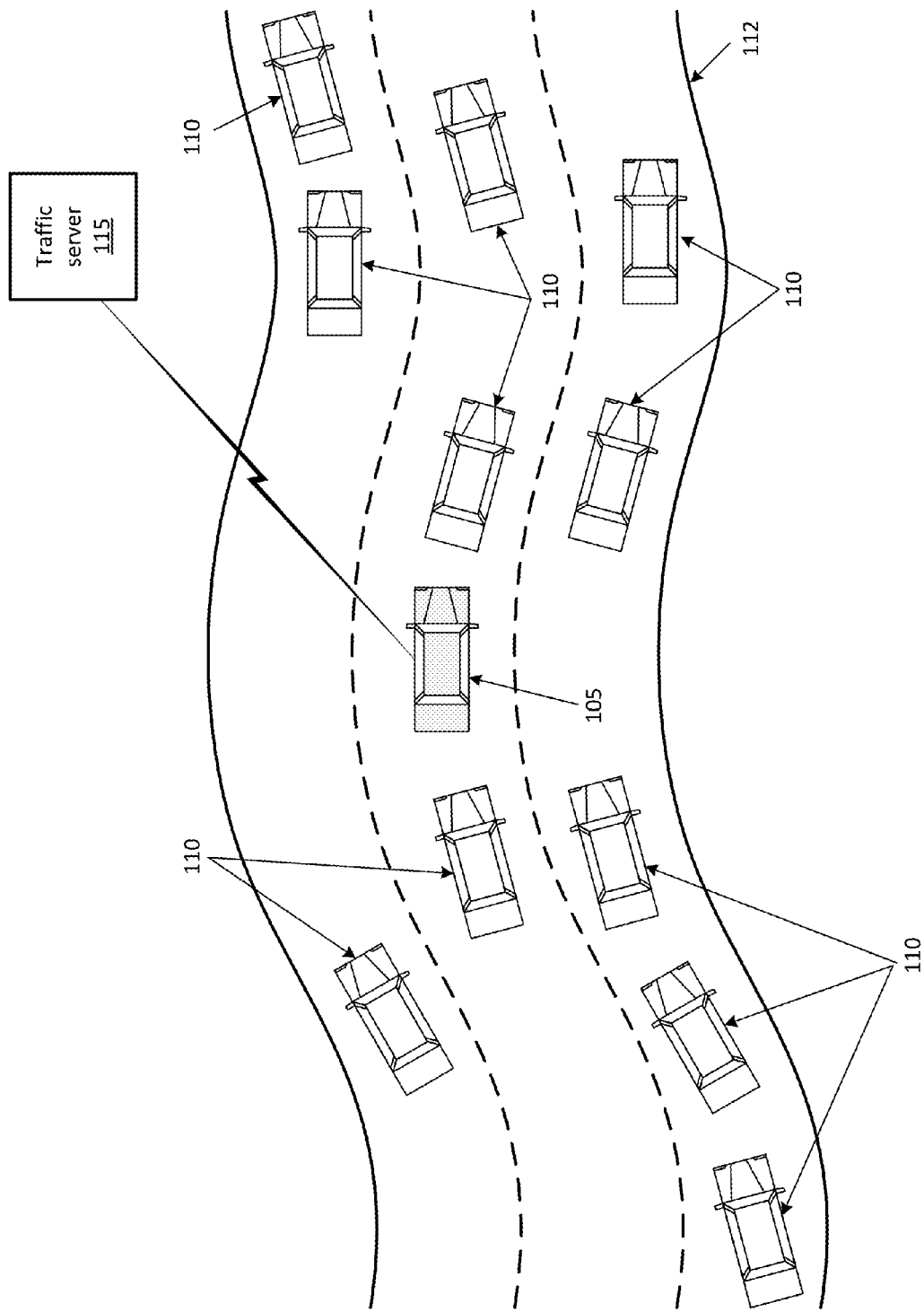

A system and/or method, described herein, may enable users to identify when a traffic condition, or congestion, exists on a roadway, without consuming excessive network bandwidth, and/or without consuming excessive power of user devices. FIGS. 1A and 1B illustrate an overview of an example implementation described herein. As shown in FIGS. 1A and 1B, automobile 105 and automobile 110 (automobile 110 may be hereinafter referred to collectively as "automobiles 110," and in some instances individually, as "automobile 110") may be traveling on a road 112. Automobile 105 may be associated with a user device (a cellular telephone, a personal digital assistant ("PDA"), a tablet computer, a laptop computer, a global positioning system ("GPS") device, etc.) in accordance with an example implementation described herein. For example, the user device may be physically located within the automobile 105.

The user device, associated with automobile 105, may be able to wirelessly communicate with traffic server 115 (e.g., through one or more wireless networks, such as a Long Term Evolution ("LTE"), CDMA2000 1X ("1X"), CDMA2000 Evolution-Data Optimized ("EV-DO"), or the like). For example, the user device, associated with automobile 105, may be capable of wirelessly transmitting information, that identifies a geographic location of the user device, to traffic server 115.

As shown in FIG. 1A, automobile 105 may be traveling on a stretch of road 112, which does not have excessive traffic congestion. Specifically, for example, on the stretch of road 112 shown in FIG. 1A, only automobiles 105 and 110 may be present. Additionally, automobile 105 may be traveling at a particular speed (e.g., at, above, or slightly below a speed limit associated with road 112). The user device, associated with automobile 105, may detect that the stretch of road 112 does not have excessive traffic congestion (or the user device may not detect that the stretch of road 112 has excessive traffic congestion). For example, the user device may detect that a speed of automobile 105 is at least above a threshold speed (where the threshold may be based a speed limit associated with the stretch of road 112). Additionally, or alternatively, the user device may not receive a notification from traffic server 115 that the stretch of road 112 has excessive traffic congestion (and/or the user device may receive a notification from traffic server 115 that the stretch of road 112 does not have excessive traffic congestion). Additionally, or alternatively, a user (e.g., a driver or a passenger) of automobile 112 may determine that the particular stretch of road 112 is not congested.

In such a scenario (i.e., when the particular stretch of road 112 is not congested), the user device may forego sending information, identifying a geographic location associated with the user device, to traffic server 115. For example, the user may not have selected an option on the user device that causes the user device to send information, identifying a geographic location associated with the user device, to traffic server 115.

When not sending the information to traffic server 115, the user device may keep a radio transceiver, that is capable of communicating with traffic server 115, in a low-power or a no-power mode (e.g., a mode in which the radio transceiver consumes less power than when the radio transceiver sends and/or receives information). By not sending its geographic location to traffic server 115, bandwidth, associated with a network through which the user device communicates with traffic server 115, is not consumed. Further, the user device is able to save power that it would have expended to send its geographic location to traffic server 115.

FIG. 1B illustrates another example scenario, in which automobile 105 is driving on a stretch of road 112, on which multiple other automobiles 110 are present. In this scenario, the user device, associated with automobile 105, may detect that the stretch of road 112 has traffic congestion. For example, the user device may detect that a speed of automobile 105 has fallen below a threshold speed (where the may be based a speed limit associated with the stretch of road 112). Additionally, or alternatively, the user device may receive a notification from traffic server 115 that the stretch of road 112 has excessive traffic congestion. Additionally, or alternatively, a user (e.g., a driver or a passenger) of automobile 112 may determine that the particular stretch of road 112 is congested.

When congestion is detected, the user device may send a message to traffic server 115. For example, the user device may send a message that indicates a geographic location of the user device and/or of automobile 105. The message may additionally identify a direction in which the user device is traveling. The message may further identify a speed of the user device and/or of automobile 105. Additionally, the message may include a picture, video, audio, and/or text. For instance, the user may take a picture of the traffic congestion, and also write a comment about the traffic congestion. These user-generated pictures and comments may be included in the message to traffic server 115.

After sending the message to traffic server 115, the user device may cease communicating with traffic server 115, until specifically prompted to do so (e.g., in response to a command from the user). Furthermore, after sending the message to traffic server 115, the user device may set a radio transceiver, over which the user device communicates with traffic server 115, in a low-power or a no-power state.

Once traffic server 115 receives the message indicating that traffic congestion exists at the identified geographic location, traffic server 115 may provide this information to one or more devices (e.g., other user devices). For example, a user may send a request, to identify traffic congestion, to traffic server 115. Traffic server 115 may provide an identification of one or more geographic locations at which traffic congestion has been identified (e.g., a geographic location associated with automobile 105, as shown in FIG. 1B). The identification of traffic congestion may be presented as an overlay on a map (e.g., as a dot, a colored line, or the like). The overlay may be selectable (e.g., a user may be able to select, or click, a dot that identifies an incident of traffic congestion). When selected, further details may be provided (e.g., pictures, videos, text, etc. that are associated with the traffic congestion).

Figure 2:
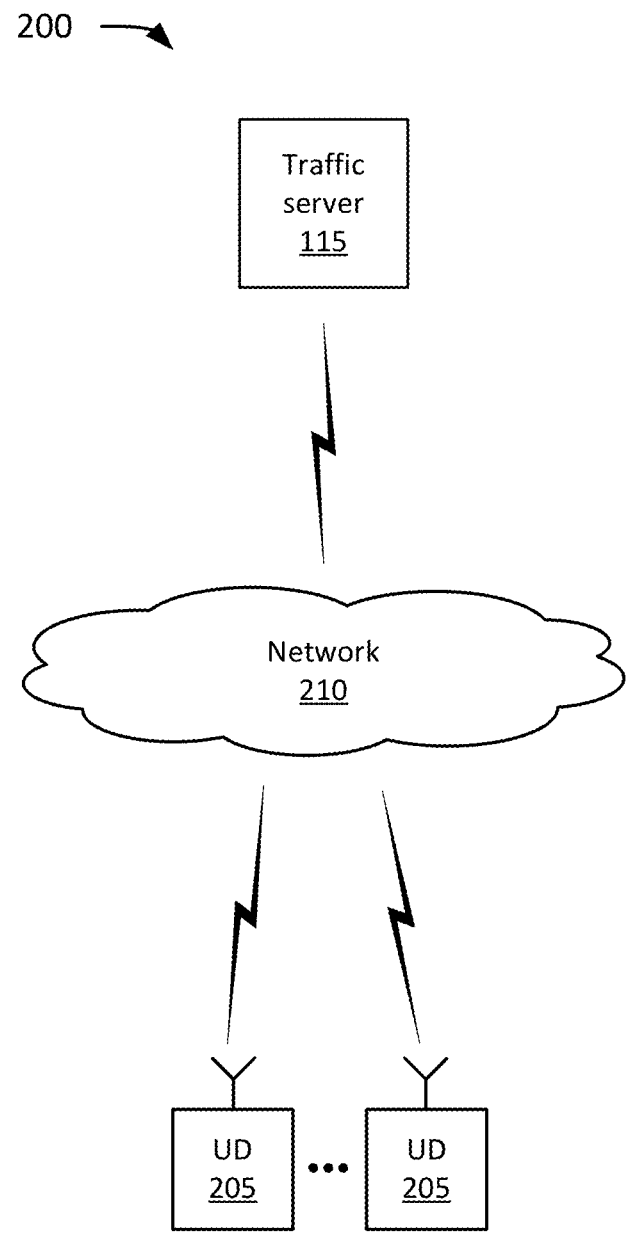
FIG. 2 is a diagram of an example system in which methods, described herein, may be implemented.

FIG. 2 depicts a diagram of an example system 200 in which systems and/or methods described herein may be implemented. As shown, system 200 may include a group of user devices 205 (referred to collectively as "user devices 205," and in some instances individually, as "user device 205"), traffic server 115, and network 210. Two user devices 205, a single network 210, and a single traffic server 115 have been illustrated in FIG. 2 for simplicity. In practice, additional user devices 205, networks 210, and/or traffic servers 115 may be used.

User device 205 may include one or more mobile devices that are capable of sending/receiving voice and/or data. User device 205 may include, for example, a radiotelephone, a personal communications system ("PCS") terminal (e.g., a terminal that may combine a cellular radiotelephone with data processing and data communications capabilities), a PDA (e.g., a device that may include a radiotelephone, a pager, Internet/intranet access, etc.), a laptop computer, a tablet computer, a GPS device, a navigational system, a desktop computer, etc.

Network 210 may include one or more devices that transfer/receive voice and/or data to a circuit-switched and/or packet-switched network. In one embodiment, network 210 may include, for example, a mobile switching center ("MSC"), a gateway mobile switching center ("GMSC"), a media gateway ("MGW"), a serving general packet radio service ("GPRS") support node ("SGSN"), a gateway GPRS support node ("GGSN"), and/or other network devices. Although shown as a single network, network 210 may include multiple networks, such as one or more radio access networks ("RANs"), one or more intranets, the Internet, etc.

Traffic server 115 may include one or more devices that receive, store, and/or provide traffic congestion information. Traffic server 115 may receive such information from, and provide such information to, one or more user devices 205 via network 210.

Figure 3:
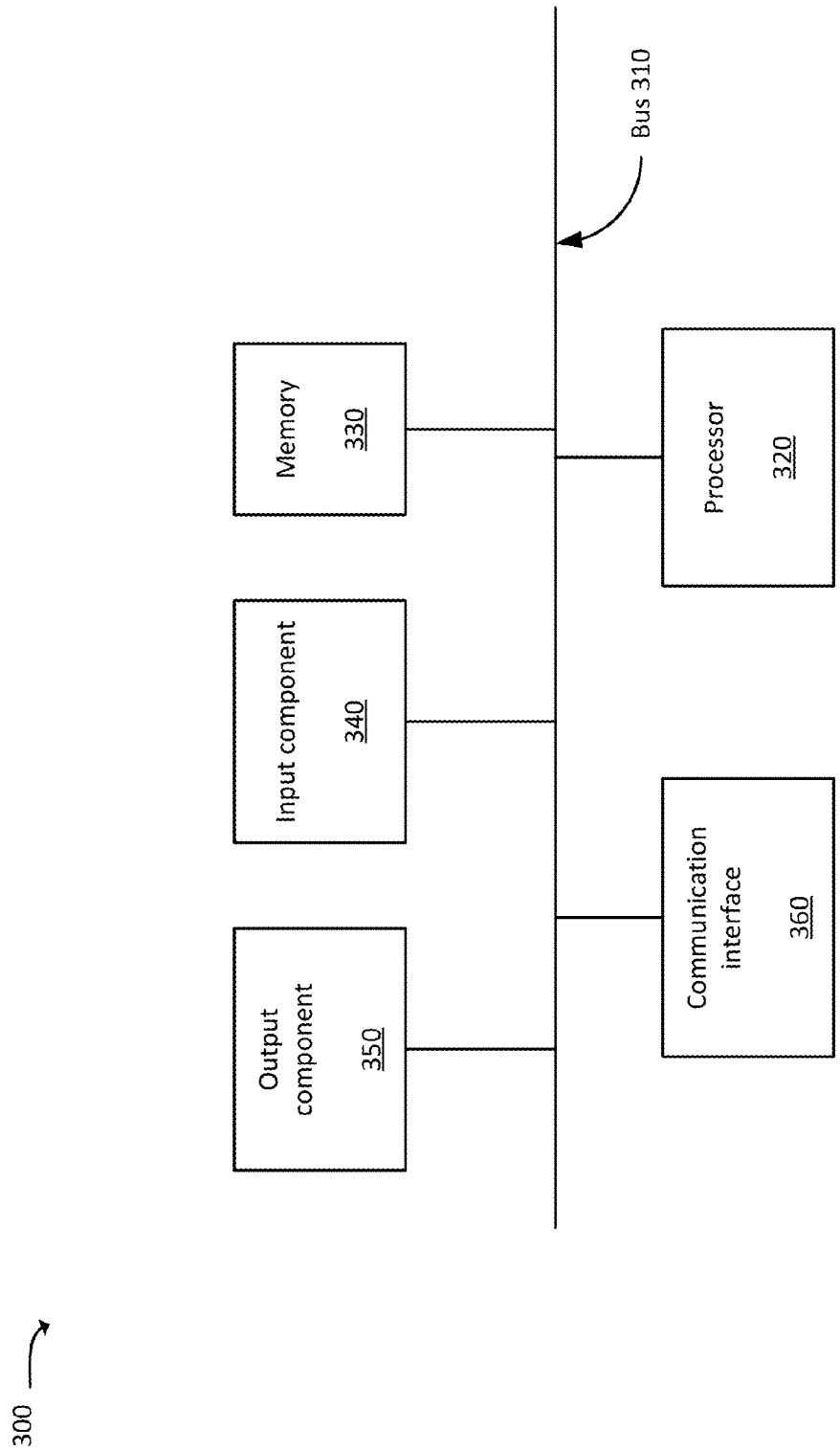
FIG. 3 is a diagram of example components of one or more devices shown in FIG. 2.

FIG. 3 is a diagram of example components of device 300. Each of the devices illustrated in FIG. 1 or 2 may include one or more devices 300. Device 300 may include bus 310, processor 320, memory 330, input component 340, output component 350, and communication interface 360. In another implementation, device 300 may include additional, fewer, different, or differently arranged components. Some non-limiting examples of device 300, with additional and/or different components, are discussed below.

Bus 310 may include one or more communication paths that permit communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a microphone, a keyboard, a keypad, a button, a switch, etc. Output component 350 may include a mechanism that outputs information to the operator, such as a display, a speaker, one or more light emitting diodes ("LEDs"), etc.

Communication interface 360 may include any transceiver-like mechanism that enables device 300 to communicate with other devices and/or systems. For example, communication interface 360 may include an Ethernet interface, an optical interface, a coaxial interface, or the like. Communication interface 360 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 300 may include more than one communication interface 360. For instance, device 300 may include an optical interface and an Ethernet interface.

As will be described in detail below, device 300 may perform certain operations relating to providing traffic information to users. Device 300 may perform these operations in response to processor 320 executing software instructions stored in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions stored in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
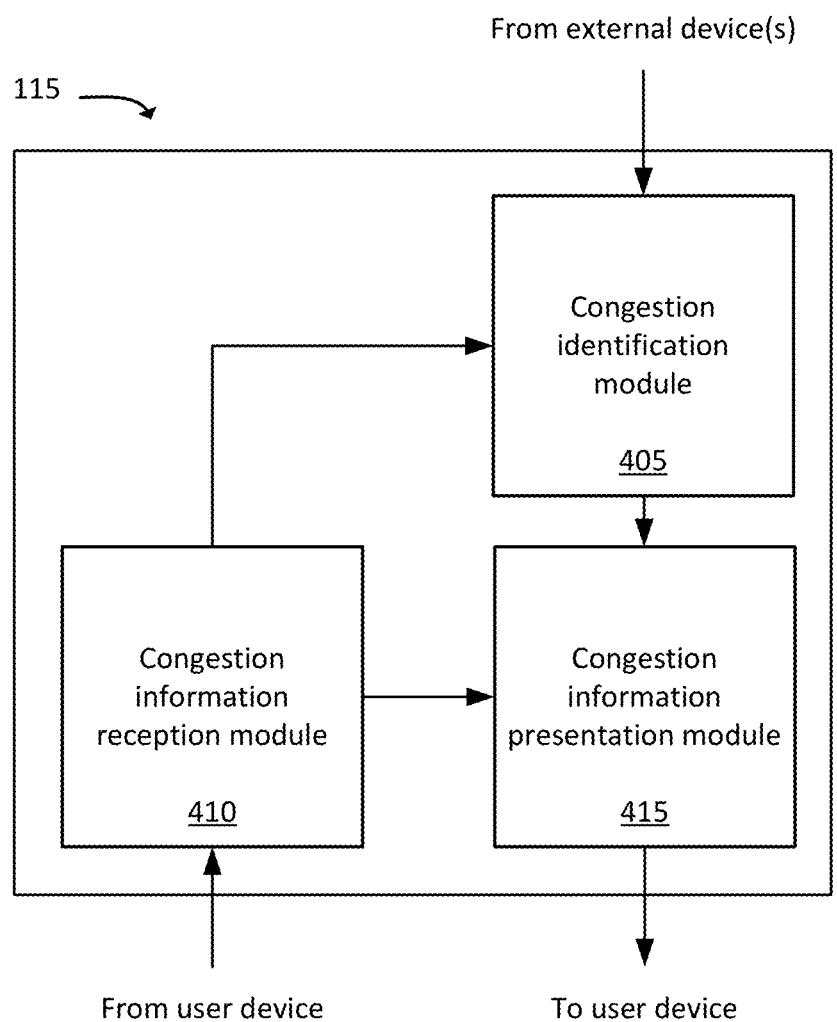
FIG. 4 is a diagram of example components of a traffic server shown in FIGS. 1A, 1B, and 2.

FIG. 4 is a diagram of example functional components of traffic server 115. As shown in FIG. 4, traffic server 115 may include modules 405-415. Any, or all, of modules 405-415 may be implemented by one or more memory devices (such as memory 330) and/or one or more processors (such as processor 320). Furthermore, multiple modules may be associated with the same memory device and/or processor (e.g., one memory device, or one set of memory devices, may store information associated with two or more of modules 405-415).

Module 405 may identify incidences of congestion, and/or notify one or more devices (e.g., user device 205) that congestion has occurred. For example, module 405 may receive information from one or more devices (such as user device 205, module 410 (described below), speed sensors, traffic cameras, and/or other devices). The information may include speed information (e.g., information identifying a speed of one or more automobiles), geographic location information of one or more automobiles and/or devices (e.g., speed sensors, traffic cameras, etc.), information identifying a direction of travel of one or more automobiles, or the like.

Module 405 may analyze the received information to identify an incidence of congestion at a particular geographic location. For example, module 405 may identify, based on the received information (e.g., based on information provided by one or more user devices 205, speed sensors, etc.), that an average speed of automobiles on a particular stretch of a road (e.g., a portion of a road that corresponds to a particular distance of the road) has fallen below a threshold speed. The threshold speed may be based on a speed limit associated with the particular stretch of road.

In such an implementation, module 405 may store information that identifies the threshold speed, and/or the speed limit associated with the particular stretch of road. The threshold speed may be a percentage of the speed limit. For example, if the speed limit at a particular stretch of road is 70 km/hr, the threshold speed may be 35 km/hr. Module 405 may receive information identifying that one or more automobiles are traveling at or below 35 km/hr (e.g., an average speed of automobiles on the particular stretch of road is at or below 35 km/hr). Module 405 may thus identify that congestion has occurred at a geographic location corresponding to the particular stretch of road.

Additionally, or alternatively, module 405 may identify congestion based on visual information received from one or more traffic cameras. For instance, module 405 may receive and analyze image(s) and/or video from one or more traffic cameras. Module 405 may perform image recognition and/or analysis techniques to identify that a density of automobiles in the image is above threshold density. For example, module 405 may identify that a quantity of automobiles is above a threshold quantity. Additionally, or alternatively, module 405 may identify that a proportion (e.g., a percentage, a ratio, etc.) of the image that corresponds to automobiles is above a threshold proportion. Additionally, or alternatively, module 405 may identify that a proportion (e.g., a percentage, a ratio, etc.) of the image that corresponds to an amount of visible road is below a threshold proportion.

Additionally, or alternatively, module 405 may receive third party congestion information (e.g., from a service that provides traffic congestion information, and/or speed information). Module 405 may use the third party congestion information to identify that congestion has occurred at a geographic location corresponding to the particular stretch of road.

Upon detecting congestion, module 405 may send a notification to one or more user devices 205, via module 415. For example, the notification may include information corresponding to the identified congestion. The notification may be sent to user devices 205, which may be approaching the identified congestion, and/or that may be traveling on a route that includes the identified congestion.

For instance, module 405 may receive (via module 410) information regarding a route and/or a geographic location associated with one or more user devices 205. Module 405 may determine that an incidence of congestion is included within the route, and/or is near the geographic location associated with the one or more user devices. In this situation, module 405 may notify (e.g., warn) the one or more user devices 205 of the congestion, so that users associated with the one or more user devices 205 may attempt to avoid the congestion. Module 405 may also calculate an alternate route, and provide the alternate route to the one or more user devices 205. The alternate route may not include congestion (or may include less congestion than the original route).

The notification sent by module 405 may additionally, or alternatively, request information from one or more user devices 205. For instance, the notification may include a notification that a user device 205 is at or near a geographic location that has been identified as being associated with congestion, and request information, such as picture information, video information, text information, speed information, etc.

In one implementation, the notification may be sent by module 405 only to user devices 205 that are at, or are within a particular distance of, a geographic location that is associated with congestion. In such an implementation, module 405 may continuously receive information regarding geographic locations of one or more user devices 205, and send the notification to user devices 205 that module 405 identifies as being within a particular distance of a geographic location that is associated with congestion. Additionally, or alternatively, module 405 may broadcast the notification to one or more user devices 205, without identifying a geographic location of user devices 205. In such an implementation, a particular user device 205 may receive the notification and determine, based on identifying its own geographic location, whether the notification is relevant to the particular user device 205 (e.g., whether the notification is associated with a geographic location of the particular user device 205).

Module 410 may receive and/or store congestion information. This congestion information may be received from one or more user devices 205. As mentioned above, the congestion information may be received in response to a request for information, sent by module 405. Additionally, or alternatively, the congestion information may be received independently of a response to a request for information, sent by module 405 (e.g., user device 205 may voluntarily send the information, without having received a request from module 405). The congestion information, received from a particular user device 205, may identify a geographical location associated with the particular user device 205. The congestion information from the particular user device 205 may include other information, such as video information, audio information, text information, speed information, etc.

Module 415 may receive congestion information, from module 410, corresponding to one or more geographic locations. The congestion information received by module 415 may also include other information associated with the one or more geographic locations, such as video, audio, text, etc. Module 415 may present congestion information regarding some or all of the geographic locations to one or more user devices 205.

For example, user device 205 may request information regarding a particular geographic area. Assume that module 415 has received congestion information regarding a particular geographic location within the particular geographic area. Module 415 may provide congestion information regarding the particular geographic location to user device 205. In turn, user device 205 may display a map that corresponds to the particular geographic area. The map may include information (e.g., a visual overlay at a location on the map that corresponds to the particular geographic location) regarding the identified congestion.

Although FIG. 4 shows example modules of traffic server 115, in other implementations, traffic server 115 may include fewer, different, or additional modules than depicted in FIG. 4. In still other implementations, one or more modules of traffic server 115 may perform the tasks performed by one or more other modules of traffic server 115.

Figure 5:
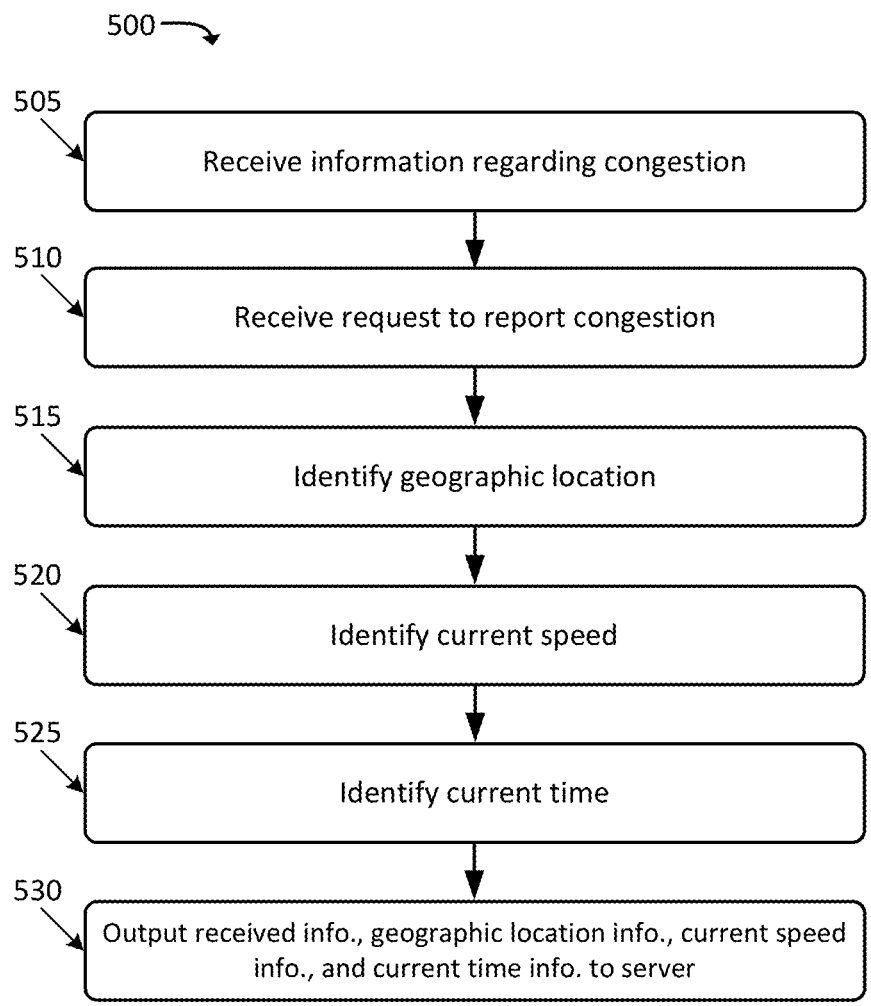
FIG. 5 is a diagram of an example process for reporting congestion.

FIG. 5 shows an example process 500 for uploading congestion information. In one example implementation, process 500 may be performed by user device 205. In another example implementation, some or all of process 500 may be performed by a device or collection of devices separate from, or in combination with, user device 205.

Figure 6:
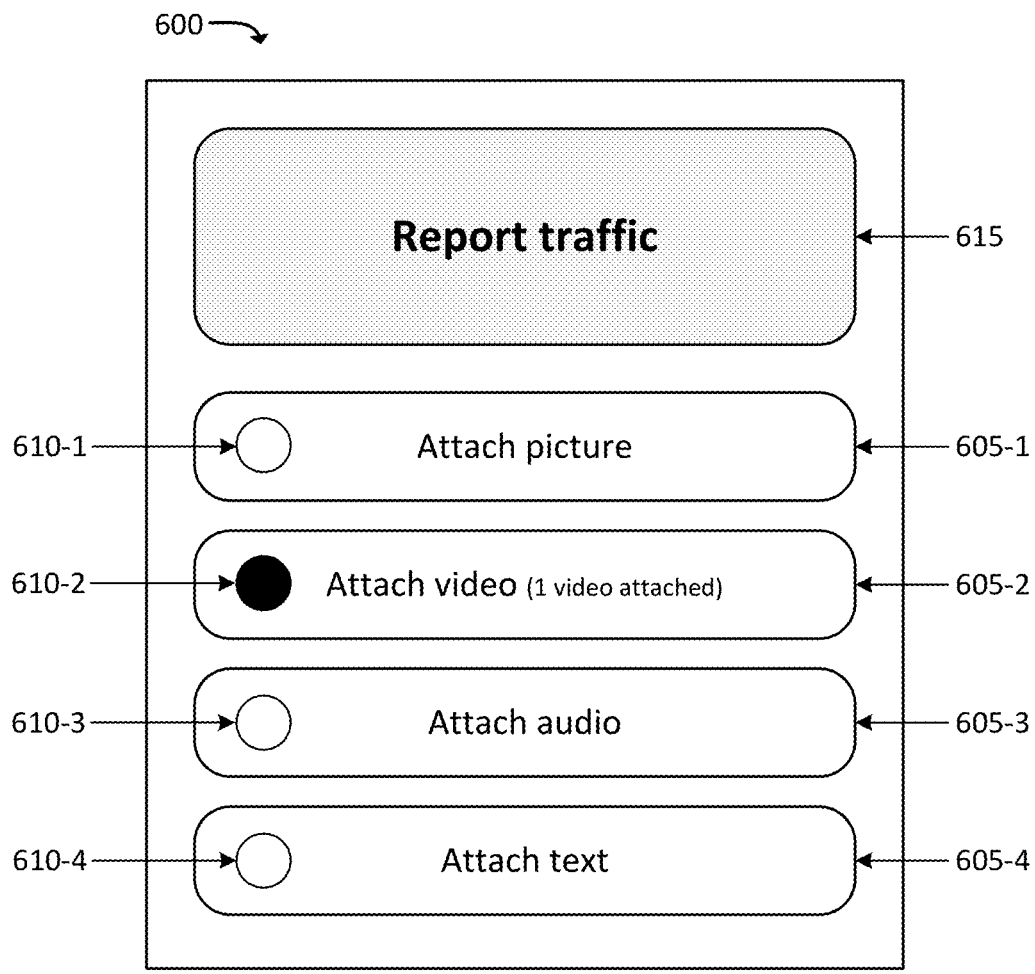
FIG. 6 is a diagram of an example user interface for reporting congestion.

FIG. 6, discussed concurrently with FIG. 5, shows an example user interface 600 for uploading congestion information. In one example implementation, user interface 600 may be presented by user device 205. In another example implementation, user interface 600 may be presented by a device or collection of devices separate from, or in combination with, user device 205.

Process 500 may include receiving information regarding congestion (block 505). For example, user device 205 may receive information regarding congestion from a user of user device 205. As discussed above, such information may include picture information, video information, audio information, text information, etc. When receiving the information regarding congestion, user device 205 may receive a selection of one or more graphical items, such as one or more buttons 605-1 through 605-4, shown in FIG. 6. Additionally, or alternatively, user device 205 may receive one or more voice commands when receiving the information regarding congestion. The received voice commands may serve to select one or more of buttons 605-1 through 605-4.

Once a particular graphical item is selected (e.g., a button 605, via voice, tactile input, or some other way), user device 205 may provide options for providing the information. For example, assume that button 610-2 has been selected. User device 205 may present an option to record a new video or upload an existing video. The video may be recorded by a camera associated with user device 205. For example, if user device 205 is a cellular telephone with an integrated camera, the video may be recorded by the integrated camera. Additionally, or alternatively, user device may be communicatively coupled to one or more cameras that are external to user device 205 (e.g., a digital camera, a vehicle camera that is associated with a vehicle in which user device 205 is presently located, etc.). A similar implementation may be used for other types of information. For example, an external camera may be used to provide pictures, an external input device may be used to provide text, an external microphone may be used to provide audio, etc.

User device 205 may also provide an indication that identifies information that has been received. For example, user interface 600 may include indicators 610-1 through 610-4, that each correspond to a type of information that has been received. As shown in FIG. 6, indicator 610-2 may be shaded differently from indicators 610-1, 610-3, and 610-4, thus indicating that a video has been received. Additionally, or alternatively, text within button 605-2 (e.g., "1 video attached") may indicate that a video has been received.

Process 500 may further include receiving a request to report congestion (block 510). For example, user device 205 may receive a request from a user of user device 205 to report congestion. The request may take the form of an input (e.g., a virtual or mechanical button press, a selection of a graphical component displayed by user device 205, etc.) from the user. In one implementation, the received input may be a selection of button 615 in user interface 600.

As shown in FIG. 6, button 615 may be displayed more prominently (e.g., at the top of user interface 600, with a different color or shading than other buttons 605, with a larger size than other buttons 605, with a different font or typeface than other buttons 605, etc.). The more prominent display of button 615 may allow a user to easily select button 615.

Process 500 may further include identifying a geographic location (block 515). For example, user device 205 may identify its geographic location using one of a variety of techniques. For instance, user device 205 may use GPS technology in order to identify its geographic location. Additionally, or alternatively, user device 205 may use cell tower triangulation, and/or another technique to determine its geographic location.

In one implementation, user device 205 may forego determining its geographic location until user device 205 receives the request to report congestion (at block 510). In such an implementation, a radio transceiver, of user device 205, that is associated with determining the geographic location of user device 205, may be in a no-power or low-power mode when the user device 205 is not determining its geographic location (e.g., a mode that consumes less power than when determining the geographic location of user device 205). Once user device 205 determines its location (at block 515), the radio transceiver may be placed back into a no-power or low-power mode.

Process 500 may further include identifying a current speed (block 520). For example, user device 205 may identify a speed of user device 205 when the request to report congestion is received (at block 510). In order to do so, user device may determine its geographic location multiple times within a particular period of time (e.g., 5 times in 5 seconds, 20 times in 5 seconds, etc.). Once user device 205 determines its speed (at block 520), user device 205 may place a radio transceiver, associated with determining the speed of user device 520, into a no-power or low-power mode.

Process 500 may also include identifying a current time (block 525). For example, user device 525 may identify a current time of day, at which the request to report congestion was received. Process 500 may further include outputting the received information, geographic location information, current speed information, and current time information (e.g., a timestamp) to a server (block 530). For example, user device 205 may output some or all of the received information (e.g., picture, video, audio, and/or text), the determined geographic location information, the current speed information, and the current time information to traffic server 115.

In one implementation, user device 205 may forego communicating with traffic server 115 until user device 205 receives the request to report congestion (at block 510). In such an implementation, a radio transceiver, of user device 205, that is associated with communicating with traffic server 115, may be in a no-power or low-power mode when the user device 205 is not outputting the received information, geographic location information, current speed information, and time information to traffic server 115 (e.g., a mode that consumes less power than when communicating with traffic server 115). Once user device 205 outputs the information to traffic server 115, (at block 530), the radio transceiver may be placed back into a no-power or low-power mode.

Although process 500 was described as including blocks 505-530, different, additional, or fewer blocks may be used, and/or a different order of blocks 505-530 may be used. For example, in some implementations, process 500 may not include block 505. In other words, a user may choose not to provide any additional information, such as a picture, a video, etc. In such an implementation, block 530 may not include outputting such information to traffic server 115. Furthermore, additional information, which may not have been specifically described with respect to block 505, may be received at block 505 and outputted at block 530. For example, user device 205 may identify a direction of travel of the user device, when the request is received to report congestion.

Additionally, or alternatively, user device 205 may continuously monitor its speed. For example, user device 205 may periodically determine its location (e.g., using GPS technology, cellular triangulation techniques, etc.), and calculate its speed based on its periodically determined location. If the speed falls below a threshold (e.g., below 20 kilometers per hour, below 10 kilometers per hour), and/or if the speed falls below a threshold amount lower than a speed limit on which automobile 105 is traveling (e.g., at least 20 kilometers per hour below the speed limit, at least 50% below the speed limit, etc.), user device 205 may automatically send a message to traffic server 115, reporting that user device 205 has encountered congestion. In such an implementation, user device 205 may store speed limit information associated with one or more portions of one or more roads.

In one implementation, the request to report congestion (at block 510) may correspond to a request received from traffic server 115. For example, as discussed above, traffic server 115 may identify congestion at a geographic location that is associated with user device 205. In such a situation, user device 205 may receive information regarding the congestion, and output the information to traffic server 115.

Figure 7:
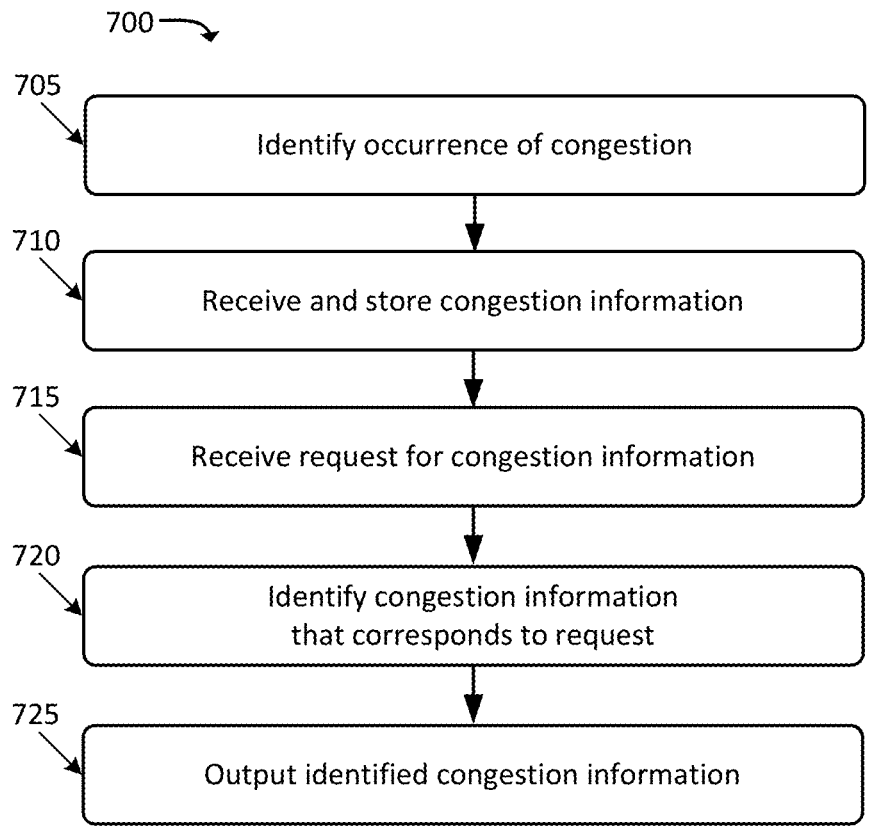
FIG. 7 is a diagram of an example process for receiving and providing congestion information.

FIG. 7 shows an example process 700 for receiving and providing congestion information. In one example implementation, process 700 may be performed by traffic server 115. In another example implementation, some or all of process 700 may be performed by a device or collection of devices separate from, or in combination with, traffic server 115.

Process 700 may include identifying an occurrence of congestion (block 705). For example, traffic server 115 may identify an occurrence of congestion at a particular geographic location. As similarly described above with respect to module 405, traffic server 115 may identify the occurrence of congestion based on, for example, information received from one or more user devices 205, traffic cameras, speed sensors, etc.

Process 700 may further include receiving and storing congestion information (block 710). For example, traffic server 115 may receive congestion information from one or more user devices 205. As discussed above with respect to FIG. 5, such congestion information may include video, audio, pictures, text, geographic location information, speed information, a timestamp, etc. Traffic server 115 may store the received congestion information in one or more memory devices associated with traffic server 115. Further, as described above, the congestion information may be received in response to a notification sent by traffic server 115, based on traffic server 115 identifying an occurrence of congestion. Additionally, or alternatively, the congestion information may be received independently of (or without) traffic server 115 identifying congestion.

Process 700 may also include receiving a request for congestion information (block 715). For example, traffic server 115 may receive a request from user device 205 for congestion information. The request may correspond to a particular geographic area, and/or to a route that corresponds to particular portions of one or more particular roads (e.g., a route that is specified as having at least a starting point and an ending point).

Process 700 may further include identifying congestion information that corresponds to the request (block 720). For example, traffic server 115 may identify congestion information (received at block 710) that corresponds to the particular geographic area and/or to the route. In order to do so, traffic server 115 may analyze geographic locations associated with the received congestion information in order to identify whether any of the received congestion information corresponds to the request.

Traffic server 115 may also identify timestamps associated with the received congestion information. If a particular incidence of congestion has been reported more than a particular amount of time prior to the request, traffic server 115 may identify that the particular incidence of congestion is not related to the request. For example, if congestion is reported at 3:00 PM at a particular location, and a request is received for congestion information at the same particular location at 6:30 PM, traffic server 115 may determine that the congestion information, associated with the 3:00 PM reported congestion, is not related to the request.

Process 700 may additionally include outputting the identified congestion information (block 725). For example, traffic server 115 may provide some or all of the congestion information, that has been identified as corresponding to the request, to user device 205. In some implementations, traffic server 115 may output congestion information only when a threshold quantity of reports of congestion have been reported within a particular area, within a particular timeframe.

For example, assume that traffic server 115 has received at least a threshold quantity of reports (e.g., 25 reports), within a particular area (e.g., within one square kilometer, within a one-kilometer radius of a particular point, within a one-kilometer stretch of road, etc.), within a particular timeframe (e.g., within one hour). In such a scenario, traffic server 115 may output the identified congestion information for the 25 reports.

On the other hand, in another example, assume that traffic server 115 has not received at least the threshold quantity of reports (e.g., 2 reports), within the particular area, within the particular timeframe. In such an example, such reports may be erroneous results, or may be otherwise insignificant. Accordingly, traffic server 115 may forego outputting congestion information relating to these reports.

These thresholds may vary, depending on geographic location and/or time of day. For example, a busy highway may be associated with one or more higher thresholds (e.g., more congestion reports would be necessary before traffic server 115 outputs information regarding the congestion reports, and/or the particular timeframe may be longer) than threshold (s) associated with a remote roadway. These thresholds may be designated manually (e.g., by one or more users, such as an administrator), and/or automatically generated (e.g., based on a type of road (such as a freeway or a non-freeway), a speed limit associated with a road, whether a road is located within a residential or a commercial area, etc.).

Figure 8:
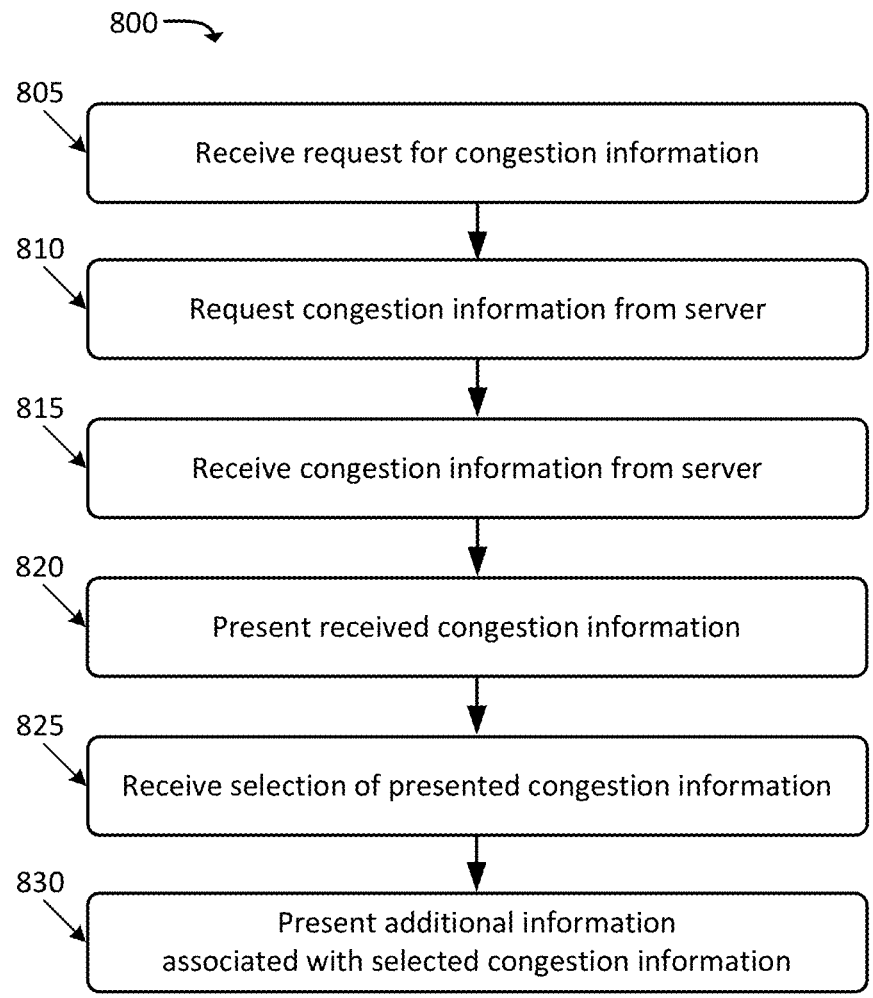
FIG. 8 is a diagram of an example process for presenting congestion information to a user.

FIG. 8 shows an example process 800 for providing congestion information at a user device. In one example implementation, process 800 may be performed by user device 205. In another example implementation, some or all of process 800 may be performed by a device or collection of devices separate from, or in combination with, user device 205.

Process 800 may include receiving a request for congestion information (block 805). For example, user device 205 may receive a request (e.g., a push of a button, a selection of a menu item, etc.) from a user of user device 205. The request may correspond to a particular geographic area and/or a particular route along one or more roads.

Process 800 may further include requesting congestion information from a server (block 810). For example, user device 205 may send a request to traffic server 115. The request may identify the particular geographic area and/or the particular route specified by the user (at block 805).

Process 800 may also include receiving congestion information from the server (block 815). For example, user device 205 may receive congestion information, that corresponds to the particular geographic area and/or the particular route specified by the user, from traffic server 115. As discussed above, the congestion information may include one or more videos, audio, pictures, text, geographic locations, timestamps, etc.

Process 800 may additionally include presenting the received congestion information (block 820). For example, user device 205 may display a map corresponding to at least a portion of the particular geographic area and/or the particular route specified by the user. The displayed map may include visual indicators that identify the congestion information. For instance, the received congestion information may identify one incidence of congestion at a particular geographic location. The map may include a visual indicator (e.g., a dot, and/or some other icon) at a location on the map that corresponds to the particular geographic location. The visual indicator may be different based on various factors. For instance, the size of the visual indicator and/or the color may depend on factors such as how long ago the congestion was reported, and/or a speed of user device 205 from which the congestion was reported. Thus, locations on the map which have a high concentration of visual indicators may serve to alert the user that such locations may correspond to congested roadways.

Process 800 may further include receiving a selection of presented congestion information (block 825). For example, user device 205 may receive a selection, by a user, of a particular incidence of congestion. Such a selection may be a selection of one or more of the visual indicators.

Process 800 may also include presenting additional information associated with the selected congestion information. For example, user device 205 may provide additional information regarding the incidence of congestion that corresponds to the user's selection. Such additional information may include video, audio, text, speed information, etc. that was provided by user device 205, from which the congestion was reported.

The additional information may include one or more other types of additional information. For example, the additional information may identify an estimated time that the congestion will clear. In such an example, traffic server 115 may access a repository that stores historical data (e.g., previously received congestion), and may estimate, based on the history data, the time(s) of day that the particular area has been associated with congestion. The repository may additionally, or alternatively, include manually entered information that identifies estimated time(s) of day that the particular area has been associated with congestion.

Furthermore, the additional information may identify an alternate route and/or routes, and/or may identify alternate roadways, that are within a particular distance from the current location of user device 205, that may be less congested. For example, traffic server 115 may not have received congestion reports regarding the alternate route(s) and/or roadway(s), and/or may have received fewer congestion reports regarding the alternate route(s) and/or roadway(s) than regarding a current geographic area in which user device 205 is located.

The device(s) and processes described above allow users to upload information identifying congestion on roadways, and to view the information identifying the congestion. Information regarding traffic congestion may be intelligently identified, by requesting information from user devices that are at or near locations that have been identified as being associated with congestion. Additionally, in some implementations, by uploading the information only upon specific request by a user, the above-described device(s) and processes may save network bandwidth that would be otherwise consumed by continuous identifying and uploading of the geographical location of a user device. Furthermore, in such implementations, power, that would be consumed by such continuous identifying and uploading, is saved by the user devices.

Further still, the device(s) and processes above may be associated with a paid subscription, whereby users who wish to view congestion information may pay a fee (e.g. a monthly fee, an annual fee, a one-time fee, etc.). Users may be rewarded for reporting congestion. For example, each time a user reports congestion, the user may be provided with a reward, such as a discount on the next period's fee (e.g., the next month's subscription fee), or credit toward another type of reward (e.g., a cash rebate, a gift card, etc.). Additionally, or alternatively, location-based advertisements may be provided along with congestion information. For example, advertisements for local businesses that are within a particular proximity of a geographic area, associated with a request for congestion information, may be provided. Local businesses, for which advertisements are presented, may pay a fee to an owner/operator of traffic server 115. For instance, the local businesses may pay a periodic (e.g., monthly, daily, etc.) fee, and/or a per-impression fee (e.g., a fee each time an advertisement regarding the business is presented).

The foregoing description of implementations provides illustration and description, but is not intended to be exhaustive or to limit the possible implementations to the precise form disclosed. Modifications and variations are possible in light of the above teachings or may be acquired from practice of the implementations. For example, while series of blocks have been described with regard to FIGS. 5, 7, and 8, the order of the blocks may be modified in other implementations. Further, non-dependent blocks may be performed in parallel. It will be apparent that embodiments, as described above, may be implemented in many different forms of software, firmware, and hardware in the implementations illustrated in the figures.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    outputting, by a user device and to a server device, a request for traffic congestion information;
    receiving, by the user device and from the server device, audio or visual information regarding an identified occurrence of traffic congestion, the audio or visual information having been captured by another user device that reported the occurrence of traffic congestion;
    presenting, by the user device, a visual representation of the occurrence of traffic congestion, the visual representation including a selectable option to hear at least a portion of the received audio information or to view at least a portion of the received visual information regarding the occurrence of traffic congestion;
    receiving, by the user device, a selection of the selectable option; and
    presenting, by the user device and based on the selection of the selectable option, the at least a portion of the received audio or visual information regarding the occurrence of the traffic congestion.

2. The method of claim 1, wherein the audio or visual information comprises at least one of:
    a picture associated with the occurrence of congestion,
    a video associated with the occurrence of congestion, or
    audio associated with the occurrence of congestion.

3. The method of claim 1, wherein the other user device is remote from the user device.

4. The method of claim 3, wherein the other user device is within a particular distance of a geographic location associated with the occurrence of traffic congestion when capturing the audio or visual information.

5. The method of claim 1, wherein the visual representation includes a map, wherein at least a portion of the map corresponds to a geographic location associated with the occurrence of congestion.

6. The method of claim 5, wherein the visual representation includes an overlay on the map, wherein a position of the overlay, on the map, is based on the geographic location associated with the occurrence of congestion.

7. The method of claim 1, wherein the visual representation includes a visual indicator that is based on one or more factors, the one or more factors including at least one of:
    a time at which the occurrence of congestion was reported.

8. The method of claim 7, wherein a size of the visual indicator is based on the one or more factors.

9. The method of claim 7, wherein a color of the visual indicator is based on the one or more factors.

10. A user device, comprising:
    a memory device storing a set of processor-executable instructions;
    one or more processors configured to execute the set of processor-executable instructions, the executing causing the one or more processors to:
        output, to a server device, a request for traffic congestion information,
        receive, from the server device, audio or visual information regarding an identified occurrence of traffic congestion the audio or visual information having been captured by another user device that reported the occurrence of traffic congestion; and
    a display device configured to:
        present a visual representation of the occurrence of traffic congestion, the visual representation including a selectable option to hear at least a portion of the received audio information or to view at least a portion of the received visual information regarding the occurrence of traffic congestion, and
        present, based on a selection of the selectable option, the at least a portion of the received audio or visual information regarding the occurrence of the traffic congestion.

11. The user device of claim 10, wherein the audio or visual information comprises at least one of:
    a picture associated with the occurrence of congestion,
    a video associated with the occurrence of congestion, or
    audio associated with the occurrence of congestion.

12. The user device of claim 10, wherein the other user device is located remotely relative to the user device.

13. The user device of claim 12, wherein the other user device is within a particular distance of a geographic location associated with the occurrence of traffic congestion when capturing the audio or visual information.

14. The user device of claim 10, wherein the visual representation includes a map, wherein at least a portion of the map corresponds to a geographic location associated with the occurrence of congestion.

15. The user device of claim 14, wherein the visual representation includes an overlay on the map, wherein a position of the overlay, on the map, is based on the geographic location associated with the occurrence of congestion.

16. The user device of claim 10, wherein the visual representation includes a visual indicator that is based on one or more factors, the one or more factors including at least one of:
    a time at which the occurrence of congestion was reported, or
    a speed associated with one or more user devices that reported the occurrence of congestion.

17. The user device of claim 16, wherein a size of the visual indicator is based on the one or more factors.

18. The user device of claim 16, wherein a color of the visual indicator is based on the one or more factors.

19. A method, comprising:
    identifying, by one or more server devices, a user device that is within a particular distance of a geographical location that is associated with an identified occurrence of traffic congestion;
    requesting, by one or more server devices, information from the user device regarding the identified occurrence of traffic congestion, the requesting being performed based on identifying that the user device is within the particular distance of a geographical location that is associated with an identified occurrence of traffic congestion;
    receiving, by the one or more server devices, the information from the user device, the information including audio or visual information captured at the user device; and receiving, by the one or more server devices, a request for traffic congestion information associated with the geographic location; and providing, by the one or more server devices and to another user device, at least a portion of the information received from the user device.

20. The method of claim 19, wherein the audio or visual information comprises at least one of:
a picture associated with the occurrence of congestion,
a video associated with the occurrence of congestion, or
audio associated with the occurrence of congestion.

* * * * *